May 26, 1970   M. E. DIRKS   3,513,747
FENCE WIRE SECURING MEANS
Filed Aug. 16, 1968
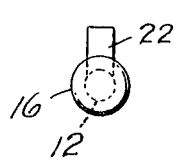
FIG. 1.
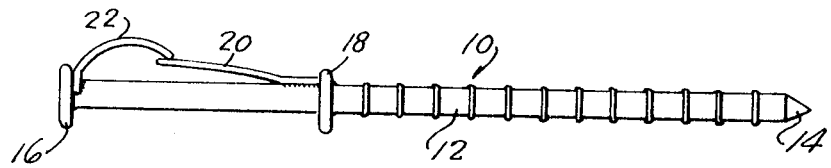
FIG. 2.
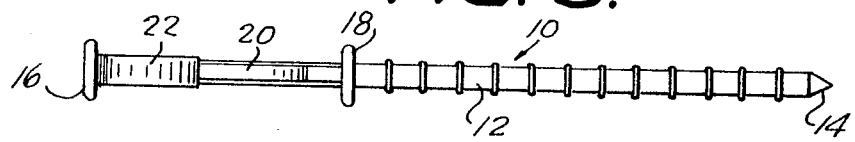
FIG. 3.
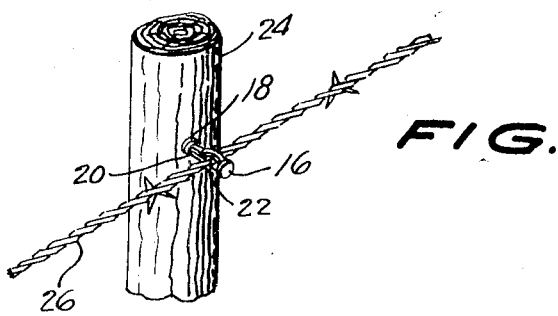
FIG. 4.
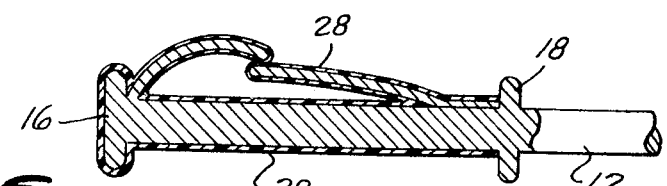
FIG. 5.
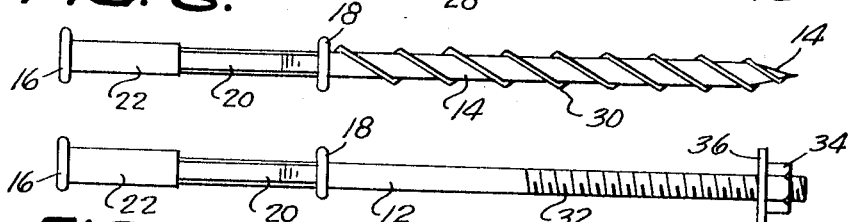
FIG. 6.
FIG. 7.
INVENTOR.
MAURICE E. DIRKS,
BY
Berman, Davidson, & Berman
ATTORNEYS.

United States Patent Office 3,513,747
Patented May 26, 1970

3,513,747
FENCE WIRE SECURING MEANS
Maurice E. Dirks, 1011 College,
Scott City, Kans. 67871
Filed Aug. 16, 1968, Ser. No. 753,212
Int. Cl. A44b 13/02; A16b 15/02; F16b 35/00
U.S. Cl. 85—9                          8 Claims

ABSTRACT OF THE DISCLOSURE

A fastener having a shank to engage a fence post; an enlarged post-engaging stop intermediate the length of said fastener; a head at one end, spaced from said stop; a blade secured to said shank adjacent said stop and extending toward said head; a second blade secured to said shank adjacent said head and extending toward said stop, the free ends of said blades overlapping.

---

This invention relates to means for securing fence wire to posts and has for its object to provide a fastener which may be driven into a post either by impact or by screw–action in a manner far more convenient and easy than is required in the use of conventional staples.

It is a further object of this invention to provide a fastener aforesaid in which the fastener is applied to the post before application of the wire and in which the wire may be easily attached and just as easily removed from engagement with the fastener.

It is a further object of this invention to provide a fastener as aforesaid in which the wire securing means may be utilized in connection with metal as well as wooden posts.

The above and other objects will be made clear from the following detailed description taken in connection with the annexed drawing, in which:

FIG. 1 is a top plan view of the improved fastener;

FIG. 2 is a side elevation taken from the right-hand side of FIG. 1;

FIG. 3 is an elevation similar to FIG. 2, but at right angles thereto;

FIG. 4 is a perspective view showing the fence post with the fastener applied and wire attached thereto;

FIG. 5 is a cross-section through the head of a special type of fastener;

FIG. 6 is a view similar to FIG. 3, but showing drive screw threads on the shank; and FIG. 7 is a view similar to FIG. 3, showing a threaded nut-receiving form of bolt end on the shank.

Anyone who has ever strung fence wire knows that the conventional two-prong staple is troublesome and difficult to drive satisfactorily. In the same post which offers great resistance to the reception of a staple, an ordinary straight shank fastener is rather easily applied and it was to take advantage of the straight shank idea in which driving effort goes on a straight line from the head to the point that this invention was conceived.

Referring now to FIGS. 1, 2 and 3, there is shown a fastener generally designated 10 and comprising a relatively straight shank portion 12 terminating in a conventional point 14. The shank 12 has a head 16 of conventional form at the end opposite the point 14 and, spaced somewhat below the head 16, there is formed an annular stop 18 similar in size and proportions to the head 16.

Adjacent the stop 18 a strip 20 of reasonably resilient metal is attached to the shank 12 while a strip of similar metal 22 is attached to the shank 12 just below the head 16.

The strip 20 is slightly bent so that its free end lies above and clear of the shank 12. The strip 22 is arcuately bent and its free end overlies the free end of the strip 20. As seen in FIG. 2, the strip 22 is slightly wider than the strip 10. In practice, the parts are arranged so that the free end of the broadest strip 22 is spaced from the shank 12 under normal conditions sufficiently to clear the thickness of the narrow strip 20 and the thickness of the strands of wire, usually ordinary barb wire, which it is desired to secure.

In FIG. 4, the fastener is shown driven into a wooden post 24 to an extent sufficient to bring the head 18 into firm engagement with the post. A wire 26 then is engaged with the fastener by pressing it against the inner, narrower strip 20 to a point where the wire clears the free end of the wider arcuate strip 22. The wire is then slid toward the top 16 until it clears the free end of the strip 20 which is sufficiently resilient to spring back into the position of FIG. 2, thereby forming a complete latch against dislodgement of the wire. If desired, a pair of pliers may then be pressed against the shank 12 and the upper strip 22, flattening the strip and thereby firmly holding the wire. This, however, usually is not necessary.

FIG. 5 shows a form intended to deal with electric fence. The fastener is submerged between the heads 16 and 18 either into liquid latex or a solution of suitable plastic material whereby to form a coating 28 upon the parts thus dipped. This coating forms an insulator and permits use of the fastener with fencing of the electric type.

In FIG. 6, the shank 12 is provided with high pitched threads 30 so that when the fastener is driven by hammer impact there will be rotation of the fastener and a firmer anchorage than would ordinarily be the case. A wide selection of such threads will be available in the art of "drive screws."

In FIG. 7, the shank 12 in the part between the heads 16 and 18 is unchanged. The point 14, which appears in the other figures, is omitted and the shank 12 is provided with ordinary bolt threads 32 to receive a nut 34 which bears optionally on a washer 36. This is designed primarily for application to metal posts and it may be desired to make the head 16 in the form of a conventional bolt head for better coaction with the nut 34 in tightening the structure.

While certain specific details have been disclosed herein, it is not intended to limit this invention to the precise details disclosed. Numerous changes, undoubtedly, will be suggested by this disclosure to others skilled in the art. The invention, therefore, is to be limited only as set forth in the subjoined claims.

What is claimed is:

1. A fastener having an elongated shank adapted to be impact driven into a fence post or the like; a radially enlarged post-engaging stop intermediate the length of said shank; a radially enlarged, impact receiving head at one end of said shank axially spaced from said stop and a pointed penetrating tip at the opposite end thereof; a resilient first blade rigidly secured to said shank rearwardly adjacent said stop and flaring radially outwardly toward said head; a second blade rigidly secured to said shank adjacent said head and extending toward said stop, the free ends of said blades overlapping with the free end of said second blade overlying the free end of said first blade, said first blade adapted to flex toward said shank to receive a wire or the like, said head and said shank being concentrically arranged with respect to said shank with the axis of said head and said stop being in alignment with the axis of every portion of said shank.

2. The fastener of claim 1, in which the blade extending from the head is wider than the blade extending from the stop.

3. The fastener of claim 1, in which the blade extending from the head is arcuate.

4. The fastener of claim 3, in which the blade extending from the head is wider than the blade extending from the stop.

5. The fastener of claim 1 in the parts between and including the head and the stop are coated with insulating material.

6. The fastener of claim 1, in which the blade extending from the head is wider than the blade extending from the stop in the parts between and including the head and the stop are coated with insulating material.

7. The fastener of claim 1, in which the blade extending from the head is arcuate in the parts between and including the head and the stop are coated with insulating material.

8. The fastener of claim 3, in which the blade extending from the head is wider than the blade extending from the stop in the parts between and including the head and the stop are coated with insulating material.

References Cited

UNITED STATES PATENTS

| | | | |
|---|---|---|---|
| 548,874 | 10/1895 | Hayward | 24—236 X |
| 1,314,808 | 9/1919 | Inman | 24—236 |
| 1,666,820 | 4/1928 | Henderson et al. | 248—217 X |
| 1,726,446 | 8/1929 | McKinney | 24—236 X |
| 2,528,288 | 10/1950 | Rublee | 85—28 X |

RAMON S. BRITTS, Primary Examiner

U.S. Cl. X.R.

24—236; 52—680; 85—28; 248—217, 339